June 25, 1935. C. H. COLVIN 2,005,935
MEANS FOR INTERCOMMUNICATION
Filed April 27, 1933 2 Sheets-Sheet 1
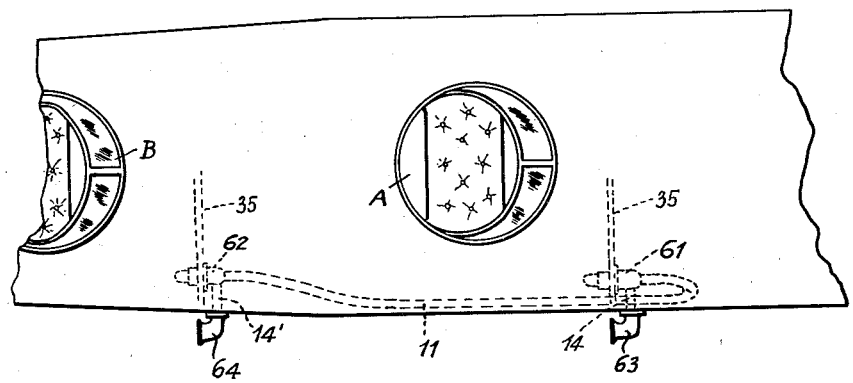
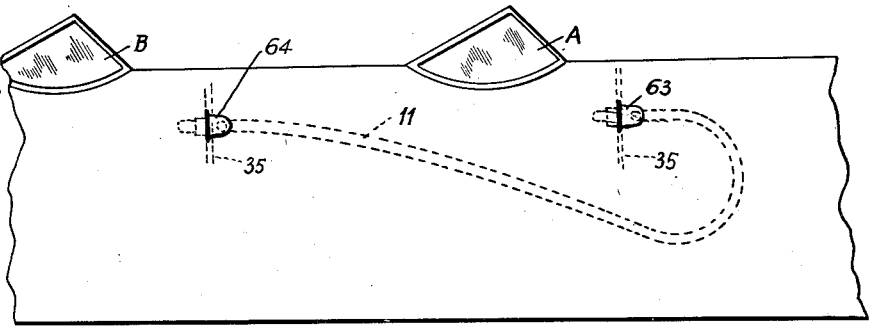
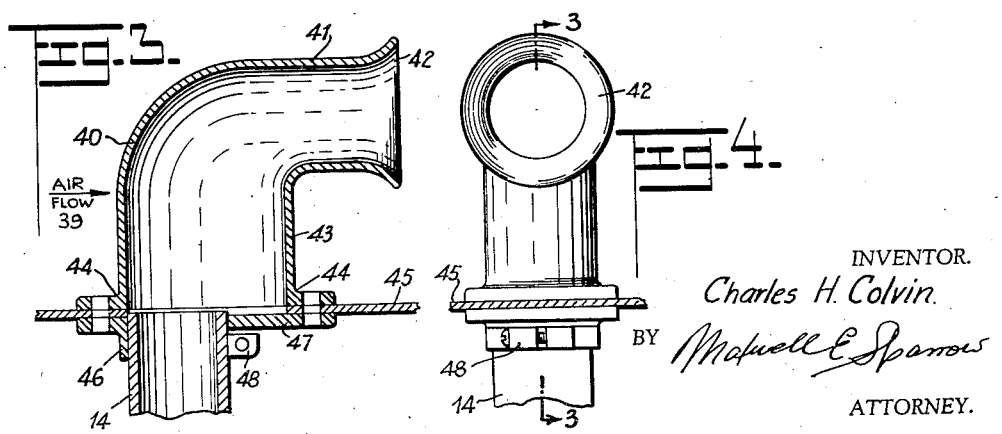
INVENTOR.
Charles H. Colvin.
BY
ATTORNEY.

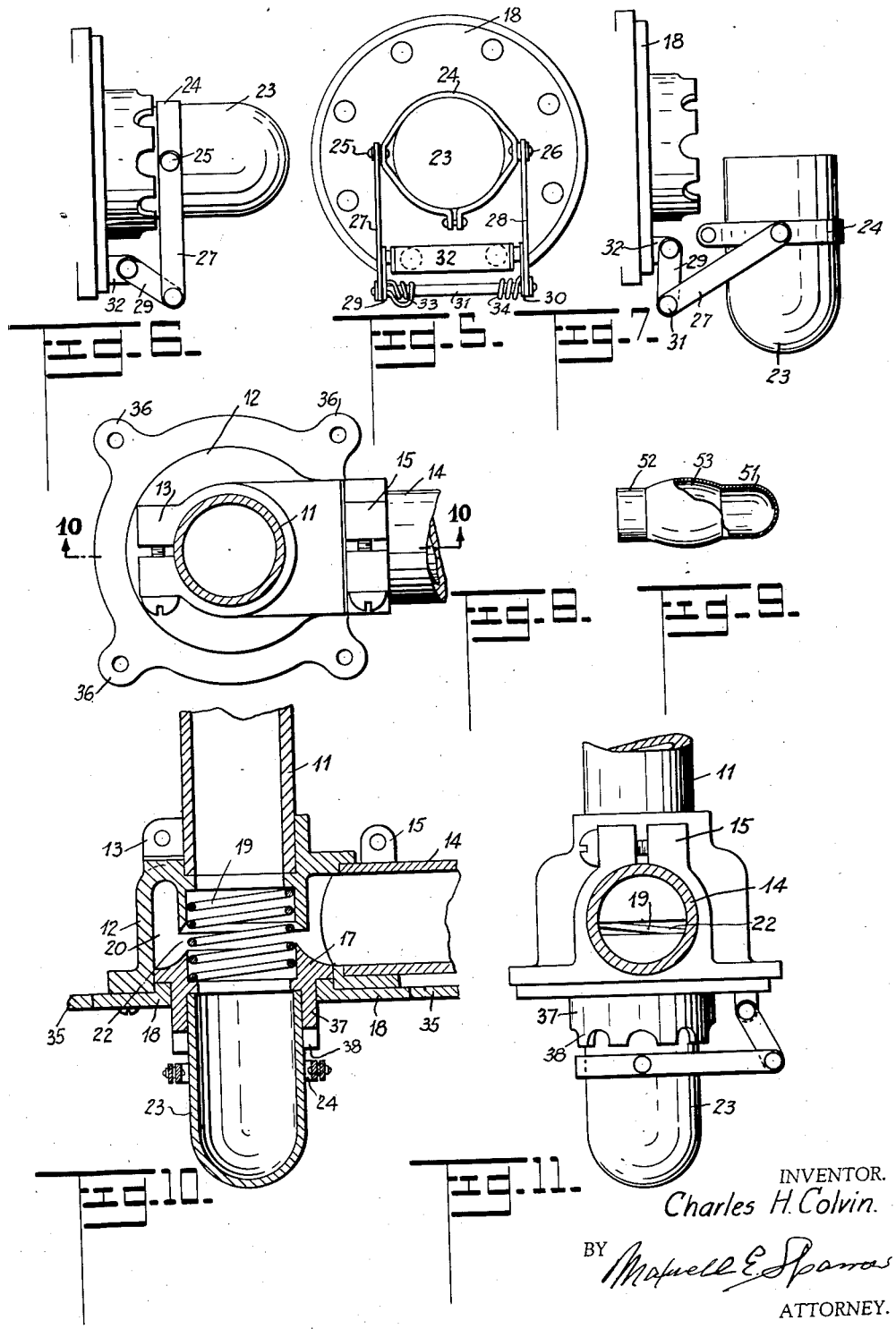

Patented June 25, 1935

2,005,935

UNITED STATES PATENT OFFICE 2,005,935

MEANS FOR INTERCOMMUNICATION

Charles H. Colvin, New York, N. Y.

Application April 27, 1933, Serial No. 668,182

12 Claims. (Cl. 243—19)

This invention relates generally to means for intercommunication and particularly to means for conveying a message from one point to another, of a vehicle.

It is a known fact that in aircraft, while in motion, articulate speech or direct communication, for instance, between the pilot and the mechanic becomes impossible due to noises incident to flight, also in speeding trains and other vehicles while in motion conveying messages by word of mouth, becomes difficult.

I have found that if a tube is connected to an area of reduced pressure at each end thereof and means provided for disconnecting one end of the tube from such area of reduced pressure and for admitting into the tube a gaseous substance, such as air, at a pressure higher than said reduced pressure, due to the flow of air resulting from the difference of pressure at the two ends of the tube, an article may be conveyed through said tube by the flow of the air.

Adequate working pressures may be obtained for employment in this system by suction pumps, and when this system is applied to a speeding vehicle, by suitable suction devices, or by the selection of locations upon the vehicle where different air pressures prevail.

Devices heretofore used for intercommunication within speeding vehicles, such as, for example, aircraft, have been impractical and inefficient. It is therefore an object of this invention to provide practical, efficient, simple and economical means for conveying messages from one part to another, of a speeding vehicle.

A further object of this invention resides in the provision of a device for transporting or conveying a carrier of messages or other objects, the carrier, which may be in the form of a capsule or cartridge, being propelled or conveyed through a tube by a pneumatic instrumentality or agent.

It is a further object of this invention to provide a device for conveying messages, from one point to another, comprising a tube having communication at each of its ends with an area of reduced pressure, means for disconnecting one end of the tube from such area of reduced pressure and for admitting at that end a gaseous substance or fluid, such as air, at a pressure higher than said reduced pressure, and a carrier for containing the message, the carrier to be conveyed through the tube by the flow of the air in the tube resulting from the difference of pressure at the two ends of the tube.

It is a further object of this invention to provide a device for conveying a carrier of messages from one compartment in an aircraft to another compartment therein, the said device containing a communicating tube between the compartments, wherein the flow of air through the tube is utilized to convey the carrier through the tube.

A further object of the invention is to effect such flow of air through said tube by utilizing and controlling the differences in air pressure created by the passage through the air of the aircraft and parts of the said device mounted upon the aircraft.

It is a further object of this invention to provide means utilizing a single tube for the conveyance of the message carriers in both directions, that is: the carrier may be despatched from either end of said tube and received at the other end thereof.

Further objects of this invention are to provide means indicating the arrival of the message carrier at the end of the tube, and means for facilitating the removal of said message carrier.

A further object of the invention is to provide a message carrier in the form of a novel capsule or cartridge.

These and other objects of the invention and the means for their attainment will be more apparent from the following detailed description, taken in connection with the accompanying drawings, illustrating a preferred embodiment by which the invention may be realized and in which:

Fig. 1 shows a diagrammatic arrangement of the various parts upon an aircraft, a top view of a portion of the latter being shown.

Fig. 2 shows a side view of the arrangement of Fig. 1.

Fig. 3 shows a sectional view of a suction device employed in the invention taken along line 3—3 of Fig. 4.

Fig. 4 shows a rear elevation of said suction device.

Fig. 5 is a front view of a combined transmitting and receiving unit embodying and employing the invention.

Fig. 6 is a fragmentary view showing the cover in its normal position within the unit.

Fig. 7 is a fragmentary view similar to Figure 6, but with the cover swung out of its normal position within the unit.

Fig. 8 is a rear view of the unit shown in Fig. 5, showing the exterior.

Fig. 9 represents a form of capsule adaptable for conveyance in said device.

Fig. 10 is a sectional view taken along line 10—10 of Fig. 8.

Fig. 11 is a side view of said unit.

The application of the invention to aircrafts is shown diagrammatically in Figures 1 and 2. A complete system of intercommunication requires two combined transmitting and receiving units connected by the preferably flexible tube 11.

The body 12 of the device is adapted to hold tube 11 by means of clamp 13 and to hold tube 14 by clamp 15. Slidably retained in body 12 is a valve ring 17. It is retained by ring 18 and is kept in normal position against ring 18 by spring 19. Valve ring 17 forms with the body 12 an annular cavity 20, which is directly connected to tube 14 at one side, and is connected through an annular ring opening 22 with tube 11. This annular ring opening 22 may be closed by moving valve ring 17 axially against spring 19. Within valve ring 17 cover 23 is positioned. Cover 23 is preferably made of transparent material, such as celluloid, for reasons which will later be explained, and may be attached to the unit by means of a linkage arrangement as illustrated specially in Figures 6, 7 and 11.

Cover 23 is encircled by a band 24 which carries hinge-pins 25 and 26. On these pins are pivoted links 27 and 28, which are pinned together and to a second pair of links 29 and 30, by a pin 31. Links 29 and 30 are pinned to a supporting piece 32, which is secured to the face of the ring 18. Springs 33 and 34 may be disposed on the pin 31 and with their ends engaging links 27 and 29 and links 28 and 30, so that these pairs of links tend to make an acute angle between them, as illustrated particularly in Figures 6 and 7.

The whole device is adapted to be mounted on a part of an aircraft, such as the instrument board 35, by means of lugs 36.

The part of valve ring 17 extending outwardly through ring 18 comprises an annulus 37 having a crowned edge 38, by means of which valve ring 17 may be moved axially and opening 22 closed, and through which a capsule may be inserted.

A form of suction device employed in the invention is shown in Figures 3 and 4, two of which are required for a complete system unless other suction means are provided, as will be explained. This suction device is adapted to be mounted on an exterior surface of the aircraft in such position that the air through which the aircraft is passing while in flight will strike such device in the direction of the arrow 39. The external part 40 of the device is preferably of cylindrical section 41 with its rear end 42 belled out to a larger diameter. Such cylindrical section 41 opens into a section 43 of "stream-line" form, which terminates at the exterior surface of the aircraft in a mounting flange 44. A portion of the aircraft is shown as the plate 45. Interior of such plate 45 is the internal part 46 of the suction device. This comprises a flange 47 and a clamp ring 48 into which the end of the tube 14, remote from the transmitting-receiving device, is retained. The interior of the suction device is thus connected through tube 14 to the annular cavity 20 of the transmitting-receiving device.

A capsule or cartridge suitable for conveyance through tube 11 is illustrated in Figure 9. This capsule is preferably made with cylindrical sections 51 and 52 at each end and an expanded barrel-shaped section 53 between the two cylindrical sections. For the conveyance of messages the message is preferably written on a piece of paper or thin celluloid which is rolled up into cylindrical form and inserted within the capsule. The capsule is preferably made of transparent material, such as celluloid, so that it is evident whether or not a message is inside.

Referring to Figures 1 and 2, two transmitting-receiving units 61 and 62 are shown, one in each cockpit of an airplane fuselage, and two suction devices 63 and 64 are disposed outside the fuselage adjacent to each cockpit. Transmitter-receiver unit 61 is connected by tube 14 to suction device 63, and transmitter-receiver unit 62 is connected by tube 14' to suction device 64. The two units 61 and 62 are connected to each other by tube 11.

It should here be explained that upon the aircraft convenient locations are frequently found where the air pressure is sufficiently lower than that of the cockpit to afford adequate working pressures for my system, without the use of the special suction devices here illustrated. Also aircraft is sometimes equipped with suction pumps of sufficient capacity to operate my system. In such cases the ends of tubes 14 and 14' here shown terminating at suction devices 63 and 64, will terminate at such low pressure locations, or be connected to such a suction pump.

By the term "area of reduced pressure" as used in this specification is meant an area of pressure lower than that of the air surrounding the transmitter-receiver units.

The operation of the system, whether using the special suction devices or natural low-pressure locations, or a suction pump, is as follows:

It is assumed that both transmitter-receiver units are complete as illustrated, with covers 23 in place. Suppose it is desired to send a message from cockpit A to cockpit B. The occupant of cockpit A prepares his message and inserts same in a capsule as shown in Figure 9. He then removes cover 23 from the transmitter-receiver unit 61 in his cockpit, permitting it to drop into the position shown in Figure 7, presses it down further against springs 33 and 34 and inserts the capsule within valve ring 17. He then presses valve ring 17 inward by means of the extending ring 37, thus closing annular opening 22 and cutting off suction from tube 14 to tube 11. The crowned edge 38 of ring 37 assists in assuring a free flow of air from cockpit A into tube 11 in back of the capsule, which is drawn through tube 11 to transmitter-receiver unit 62 in cockpit B, by the suction from tube 14'. Having completed the transmission, the occupant of cockpit A replaces cover 23 and is ready to receive a message.

In the meantime the arrival of the capsule at transmitter-receiver unit 62 has been observed by the occupant of cockpit B through the transparent cover 23 of his unit. In fact, depending upon the degree of suction employed, and the tightness with which cover 23 is fitted within ring 17, the arrival of the capsule may eject both cover 23 and itself from unit 62. The cover 23 with the capsule within it will then swing down into the position shown in Figure 7. Removal of the capsule and replacement of cover 23 makes unit 62 again ready to receive a message.

For sending a message from cockpit B to cockpit A the occupant of cockpit B follows the same procedure as hereinabove described.

The form of capsule shown in Figure 9 is particularly adapted as a message carrier, its barrel-shaped central portion enabling the capsule to offer a minimum of resistance and to maintain its axial position during its advancement within the tube. It is understood, however, that the message carrier is not limited to any particular form or shape.

In the accompanying drawings, I have illustrated the invention embodied in one of its practical commercial forms, but as this illustration is primarily for purposes of disclosure, it will be understood that the invention is not limited to this particular form of structure and that it may be modified in many respects without departure from the true spirit and scope of the invention as herein defined and claimed. I wish it further understood that the terms which I have employed herein are used in a descriptive rather than in a limiting sense, except however for such limitations that may be imposed by the state of the prior art.

Having thus described my invention, what I claim as new and desire to secure by Letters Patent, is:

1. In combination, a conveyance tube, a suction tube for each end of said tube, a carrier, and valve means for disconnecting one of said suction tubes from one end of said tube and to admit said carrier to such end of said conveyance tube.

2. In combination, a conveyance tube, means connecting each end of said tube to an area of reduced pressure, a member providing a closable connection between one end of said tube and said means, a closure for said member, means through which an article may be inserted into said tube upon opening said closure, and a valve within said member for closing said connection between one end of said tube and said means.

3. In combination, a conveyance tube, means connecting the tube to reduced air pressure at each end of said tube, a member providing a closable connection between one end of said tube and said means, means through which an article may be inserted into said conveyance tube, and a valve within said member for closing said connection.

4. A device comprising a conveyance tube, a suction tube, means for applying suction to said conveyance tube remote from said suction tube, and a member through which a capsule may be inserted into said conveyance tube, said member providing a connection between said conveyance tube and said suction tube, said member containing a valve for closing said connection.

5. In a system for intercommunication, in combination a carrier, a conveyance tube, two transmitter-receiver members, two suction devices, a suction tube connecting one of said members to one of said devices, a second suction tube connecting the other of said members to the other of said devices, said conveyance tube connected between said members, a removable cover for each of said members, a normally open valve associated with each of said members, one of said valves normally providing passage from said first suction tube to one of said conveyance tube, the other of said valve normally providing passage from said second suction tube to the other end of said conveyance tube, each of said members having an opening wherein, upon removing said cover, said carrier may be inserted in position to enter one end of said conveyance tube, and means whereby one of said valves may be moved to close the passage from such end of said conveyance tube to one of said suction tubes.

6. A system for intercommunication comprising a carrier, a conveyance tube, two transmitter-receiving members, two suction devices, a suction tube connecting one of said members to one of said devices, a second suction tube connecting the other of said members to the other of said devices, said conveyance tube connected between said members, a cover for each of said members, a normally open valve contained in each of said members, one of said valves normally providing passage from said first suction tube to one end of said conveyance tube, the other of said valves normally providing passage from said second suction tube to the other end of said conveyance tube, each of said members having an opening wherein upon opening said cover, said carrier may be inserted in position to enter one end of said conveyance tubes, and means whereby one of said valves may be moved to close the passage from such end of said conveyance tube to one of said suction tubes, the pressure difference created by the opening of said cover and closing of said passage causing a flow of air through the conveyance tube and carrying the said carrier to the member at the end of said conveyance tube remote from that at which it was inserted.

7. A system for intercommunication comprising a carrier, a conveyance tube, two transmitter-receiver members, two suction devices, a suction tube connecting one of said members to one of said devices, a second suction tube connecting the other of said members to the other of said devices, said conveyance tube connected between said members, each of said members having a hollow cover hingedly connected thereto, a normally open valve contained in each of said members, one of said valves normally providing passage from said first suction tube to one end of said conveyance tube, the other of said valves normally providing passage from said second suction tube to the other end of said conveyance tube, each of said members having an opening wherein, upon removal of said cover, said carrier may be inserted in position to enter one end of said conveyance tubes, and means whereby one of said valves may be moved to close the passage from such end of said conveyance tube to one of said suction tubes, the pressure difference created by the opening of said cover and closing of said passage causing a flow of air through the conveyance tube and carrying the said carrier to the member at the end of said conveyance tube remote from that at which it was inserted, and said carrier upon its arrival at said remote member causing the removal of said remote member's cover and the retention of said carrier within said cover.

8. A conveyance system comprising a conveyable capsule, a conveyance tube, a transmitter member, two suction tubes, one end of said conveyance tube being connected to said member, the other end of said conveyance tube being connected to one of said suction tubes, the second of said suction tubes being connected to said member, each of said suction tubes being connected to a source of suction, said member being provided with a removable cover, the removal of which permits the insertion of said capsule in position to enter said conveyance tube, and the removal of which cover also connects the interior of said member to the air surrounding said member, a valve within said member which normally maintains connection between said conveyance tube and the second of said suction tubes, and means for moving said valve to close said connection.

9. A conveyance system comprising a conveyable capsule, a conveyance tube, a transmitter-receiver member, a second transmitter-receiver member, a suction tube, a second suction tube, one end of said conveyance tube being connected to said first member, the other end of said conveyance tube being connected to said second member, said first suction tube being connected to said first member, said second suction tube being connected to said second member, each of said suction tubes being connected to a source of suction, each of said members being provided with a removable cover, the removal of which permits the insertion of said capsule in position to enter said conveyance tube, and the removal of which cover also connects the interior of such member to the air surrounding such member, a valve within each of said members, said valve normally maintaining connection between one end of said conveyance tube and one of said suction tubes, and means for moving said valve to close said connection.

10. A conveyance system comprising a conveyable capsule, a conveyance tube, a transmitter-receiver member, a second transmitter-receiver member, one end of said conveyance tube being connected to said first member, the other end of said conveyance tube being connected to said second member, said members being connected to a source of suction, each of said members being provided with a removable cover, the removal of which permits the insertion of said capsule in position to enter said conveyance tube, and the removal of which cover also connects the interior of such member to the atmosphere, a valve associated with each of said members, said valve normally maintaining connection between one end of said conveyance tube and said source of suction, and means for moving said valve to close said connection.

11. A conveyance system comprising a conveyance tube, a transmitter member, two suction tubes, one end of said conveyance tube being connected to said member, the other end of said conveyance tube being connected to one of said suction tubes, the second of said suction tubes being connected to said member, each of said suction tubes being connected to a source of suction, said member being provided with a removable cover, the removal of which permits the insertion of a conveyable capsule in position to enter said conveyance tube, and the removal of which cover also connects the interior of said member to the air surrounding said member, a valve within said member which normally maintains connection between said conveyance tube and the second of said suction tubes, and means for moving said valve to close said connection.

12. A conveyance system comprising a conveyance tube, a transmitter-receiver member, a second transmitter-receiver member, a suction tube, a second suction tube, one end of said conveyance tube being connected to said first member, the other end of said conveyance tube being connected to said second member, said first suction tube being connected to said first member, said second suction tube being connected to said second member, each of said suction tubes being connected to a source of suction, each of said members being provided with a removable cover, the removal of which permits the insertion of a conveyable capsule in position to enter said conveyance tube, and the removal of which cover also connects the interior of such member to the air surrounding such member, a valve within each of said members, said valve normally maintaining connection between one end of said conveyance tube and one of said suction tubes, and means for moving said valve to close said connection.

CHARLES H. COLVIN.